May 7, 1935.  C. J. DU BRUL  2,000,634
METHOD OF MITERING SHEET MATERIAL
Filed June 13, 1934

Inventor
Clarence J. DuBrul

By Knight Bros
Attorneys

Patented May 7, 1935

2,000,634

UNITED STATES PATENT OFFICE 2,000,634

METHOD OF MITERING SHEET MATERIAL

Clarence J. Du Brul, Cincinnati, Ohio

Application June 13, 1934, Serial No. 730,499

5 Claims. (Cl. 93—58)

This invention relates to a method of making mitered corners and has for its principal object to provide a practical method for mitering cardboard and similar sheet materials. Though the invention might be applied to various sheet materials differing from cardboard, its advantages are most evident when working with cardboard-like sheets.

Various means have been used to make a V-shaped score in sheet materials to enable the material to be bent. In some cases a pair of rotary knives mounted at an angle to each other has been employed, but when applied to cardboard these knives prove unsatisfactory. Since they cut into the material at an angle of about 45°, if they are made thin enough to cut as a knife they are so flexible that it is impossible to direct them accurately toward the line which is intended to be the bottom of the groove. Moreover, cardboard ordinarily contains more or less sand, being a cheap material sold at a price which does not allow much refinement. This sand rapidly dulls the knives and makes them still less able to maintain a true course. It is also hard to set the knives to cut accurately to the desired line. If they go not quite deep enough they do not clean out the bottom of the groove. If they are set too deep they cut through the very thin section that is left between the bottom of the groove and the opposite side of the cardboard, or so weaken this thin section that it breaks when folded.

A rotary saw or milling cutter with V-shaped teeth is likewise an unsatisfactory tool for scoring cardboard. The teeth of the saw are rapidly dulled by the sand in the cardboard, requiring too frequent sharpening. Due to the pulpy nature of cardboard the speed of the saw must be very high and the rate of feed very slow, because a saw will only remove material from cardboard in fine chips. If the chip is large it does not clear the tool as a wood or metal shaving does.

Dull tools and high speeds, either of knives, saws, or milling cutters, tend to burn the material as the cutters heat up due to the grit and consequent friction. Burned or scorched cardboard does not make a good box.

A V-shaped cutting stone is unable to hold a sharp edge for long and also becomes clogged with pulp, resulting in burning of the cardboard.

Figure 1:
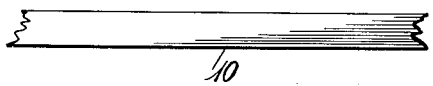
Figure 2:
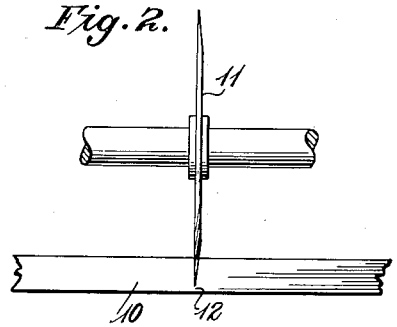
Figure 3:
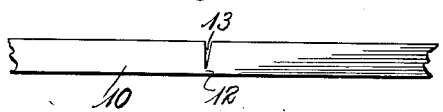
Figure 4:
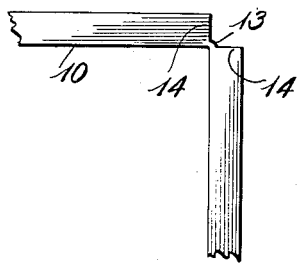

These difficulties are avoided by my method, which will now be described with reference to the accompanying drawing diagrammatically illustrating the process. In this drawing Fig. 1 is an edge view of a sheet of cardboard to be scored, Fig. 2 is an elevation of the cutting step, Fig. 3 is an edge view of the sheet after the cutting step, Figs. 4 and 5 are elevations showing the next two steps, Fig. 6 shows an end view of the sheet after the third step has been completed, and Fig. 7 shows the final step of the process.

A sheet of cardboard is first cut along a line where it is to be folded to make a corner, by a knife 11, preferably a positively driven circular knife, to a depth which leaves just a small uncut thickness 12. Since the knife is normal to the sheet it does not tend to flex, nor does dulling of the knife seriously interfere with its operation. This step is shown in Figs. 2 and 3. The sheet thereupon is bent as indicated in Fig. 4, in the direction to open the slot 13. Next the shoulders 14 at the sides of the slot are removed by any suitable tool, such as a sanding disc 15 (Fig. 5). In the method shown in the drawing the sheet is bent in Fig. 4 to 90° and the shoulders are cut away in Fig. 5 down to a plane which passes substantially through the bottom of the groove 13. While this is the preferred method for making a right angular corner, it would be possible to bend the sheet more or less than 90°, and also to cut off the shoulders 14 in such a way that the remaining surfaces do not lie in a plane.

Figure 5:
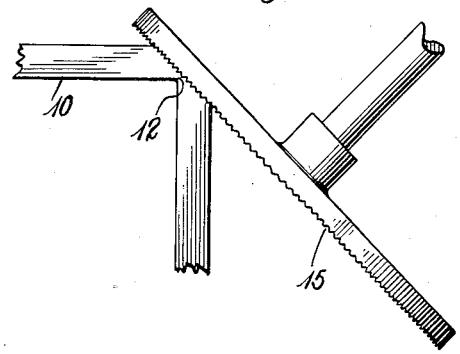
Figure 6:
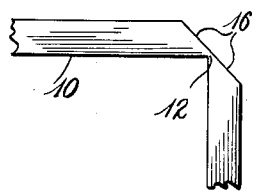
Figure 7:
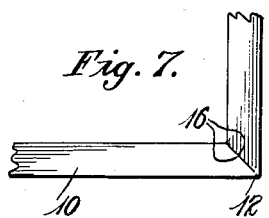

After the third step shown in Fig. 5 the bent sheet will have the appearance indicated in Fig. 6. Thereupon the sheet is bent to bring the surfaces 16 together, in the manner shown in Fig. 7.

In order to make a good square corner it is necessary to remove the material along the groove and not simply to press it aside. It is also necessary to cut the groove accurately to within a certain distance of the uncut surface of the sheet, for if the groove is not deep enough the corner will be bulgy and rounded, and if it is too deep it will be weak and liable to break. It will be evident that the process will be practicable only with materials which, in thin sections, are capable of bending through a substantial angle in two directions.

In the manufacturing and using of cardboard boxes, it is usual for the manufacturer to ship the cardboard boxes as shucks, that is, flat, in which case the user folds the boxes. My invention covers the manufacture of shucks adapted to be folded into a box, as well as the full process including the final folding step.

Having thus described my invention, I claim:—

1. The process of making a mitered corner in sheet material of the nature of cardboard, which comprises cutting a slot nearly through the sheet, bending the material at the slot in the direction to open the slot, removing the projecting shoulders along the slot, and bending the sheet in the reverse direction to bring together the surfaces formed by the removal of said shoulders.

2. The process of making a mitered corner in sheet material of the nature of cardboard, which comprises cutting a slot through slightly less than the full thickness of the sheet in a direction substantially normal to its surface, bending the material at the slot in the direction to open the slot, removing the projecting shoulders along the slot, and bending the sheet in the reverse direction to bring together the surfaces formed by the removal of said shoulders.

3. The process of making a mitered corner in sheet material of the nature of cardboard, which comprises cutting a slot nearly through the sheet, bending the material at the slot in the direction to open the slot, removing the projecting shoulders along the slot, and bending the sheet in the reverse direction to bring together the surfaces formed by the removal of said shoulders, the angle to which the sheet is first bent and the angular relation between the surfaces formed by the removal of said shoulders being such that when the sheet is bent in the reverse direction it forms an angle of 90°.

4. The process of making a mitered corner in sheet material of the nature of cardboard, which comprises cutting a slot nearly through the sheet, bending the sheet to an angle of 90° to open the slot, removing from the shoulders at the sides of the slot all material beyond a plane passing substantially through the bottom of the slot at an angle of 45° to a surface of the sheet, and then bending the sheet 180° in the reverse direction.

5. The process of mitering sheet material of the nature of cardboard, which comprises cutting a slot nearly through the sheet, bending the material at the slot in the direction to open the slot, and removing the projecting shoulders along the slot.

CLARENCE J. DU BRUL.